United States Patent [19]
Relin et al.

[11] Patent Number: 5,593,252
[45] Date of Patent: *Jan. 14, 1997

[54] METHOD OF AND DEVICE FOR SUCTION TRANSPORTING

[76] Inventors: Arkadi Relin, 12 Woodbridge Pl., Langhorne, Pa. 19053; Anatole Milstein, 3 Covered Bridge Path, Philadelphia, Pa. 19115

[*] Notice: The term of this patent shall not extend beyond the expiration date of Pat. No. 5,201,877.

[21] Appl. No.: 325,202

[22] PCT Filed: Apr. 12, 1993

[86] PCT No.: PCT/US93/03385

§ 371 Date: Jan. 3, 1995

§ 102(e) Date: Jan. 3, 1995

[87] PCT Pub. No.: WO93/22228

PCT Pub. Date: Nov. 11, 1993

Related U.S. Application Data

[63] Continuation of Ser. No. 874,122, Apr. 24, 1992, Pat. No. 5,201,877.

[51] Int. Cl.⁶ .................................... B65G 53/66
[52] U.S. Cl. .............. 406/85; 406/93; 406/151; 15/404; 37/320
[58] Field of Search ................ 406/85, 93, 113, 406/115, 151, 152, 153, 192; 15/375, 404, 421; 37/317, 320, 321; 137/893; 251/121; 417/290, 295, 306

[56] References Cited

U.S. PATENT DOCUMENTS

| | | | |
|---|---|---|---|
| 1,508,521 | 9/1924 | Kreuser | 37/318 |
| 3,263,615 | 8/1966 | Hofer | 37/311 |
| 5,201,877 | 4/1993 | Relin et al. | 406/85 |

*Primary Examiner*—Andrew C. Pike
*Attorney, Agent, or Firm*—I. Zborovsky

[57] ABSTRACT

A material is transported by suction through a transporting line (1,2) connected with a suction source (4) and communicating with atmosphere through a passage (8), and the area and shape of the passage is periodically changed by a power-drive operated element (10,11) during the transporting.

10 Claims, 2 Drawing Sheets

METHOD OF AND DEVICE FOR SUCTION TRANSPORTING

CROSS-REFERENCE TO RELATED APPLICATION

This application is a continuation of application Ser. No. 07/874,122, filed Apr. 24, 1992, now U.S. Pat. No. 5,201,877.

TECHNICAL FIELD

Our invention relates to a method of and a device for suction transporting. More particularly, it relates to a transporting method and device which use a suction force for transporting solid and liquid particles by a carrying agent.

BACKGROUND ART

Suction transporting methods and devices are known in the art. In known methods and devices air and water from the environment are normally used as carrying agents. One example of this is a dry-wet vacuum cleaner in which air is used as a carrying agent for transporting solid and liquid particles. Another example is a suction dredge which uses water as a carrying agent for transporting solid particles. A known transporting method and device usually utilizes a source of suction, for example a fan driven by an electric motor, and a transporting line formed as a hollow elongated body. A suction nozzle can be attached to the front end of the transporting line and adapted to take in the carrying agent with the material to be transported. The efficiency of the transportation is determined here primarily by a magnitude of a suction force which is developed at the surface from which the material is taken in by the suction nozzle. The strongest suction force in a particular suction method and device is obtained when the edge of the suction nozzle has a good contact with the surface. However, due to a strong suction force developed by such a nozzle, it sticks to the surface and as a result it becomes very difficult and sometimes impossible to move the nozzle along the surface.

Various means are used to reduce sticking and to achieve better mobility of a suction nozzle. For example, special cuts are made in the edges of the nozzle, or the nozzle is kept elevated above the surface. When the cutting or elevating of the suction nozzle is not desirable, an adjustable slot with a valve body is made in the wall of the transporting line as disclosed, for example, in the U.S. Pat. No. 3,048,876. The above means increases the mobility of the suction nozzle, but at the same time, permanently reduces the suction force at the surface where the material is being taken, and therefore permanently decreases the efficiency of the suction transporting.

SUMMARY OF THE INVENTION

In accordance with the present invention, we provide a method of and a device for suction transporting, in which sticking of a suction nozzle to a surface is eliminated and as a result the efficiency of transporting is increased. Simultaneously, an agitating effect is created on the surface wherein the material to be transported is accumulated.

In order to achieve these objects, in our new suction transporting method a material to be transported is received in a transporting line through an inlet and discharged from it through an outlet under the action of suction created by suction means connected to the transporting line, a suction force of the suction produced in the transporting line is modulated by a passage which communicates the interior of the transporting line with atmosphere, an adjusting element which adjusts an initial area and shape of a minimal cross section of the passage, and a valve with a valve body displaced by a drive and periodically changing the initial area and shape of the minimal cross section of the passage.

These objects are also achieved by our suction transporting device which has a transporting line connected to suction means and transporting the material from its inlet to its outlet by suction, means for modulating the suction force in the transporting line and including a passage communicating the interior of the transporting line with atmosphere, an adjusting element which adjusts an initial area and shape of a minimal cross section of the passage, and a valve having a valve member which is displaced by a drive and periodically changes the initial area and shape of the minimal cross section of the passage.

When the method is performed and the device is designed in accordance with our invention, the above mentioned advantages are obtained.

BRIEF DESCRIPTION OF DRAWINGS

The details of our invention will be described in connection with the accompanying drawings, in which

FIG. 2 is an enlarged vertical section of a suction force modulator of the inventive device while

BEST MODE FOR CARRYING OUT THE INVENTION

Figure 1:
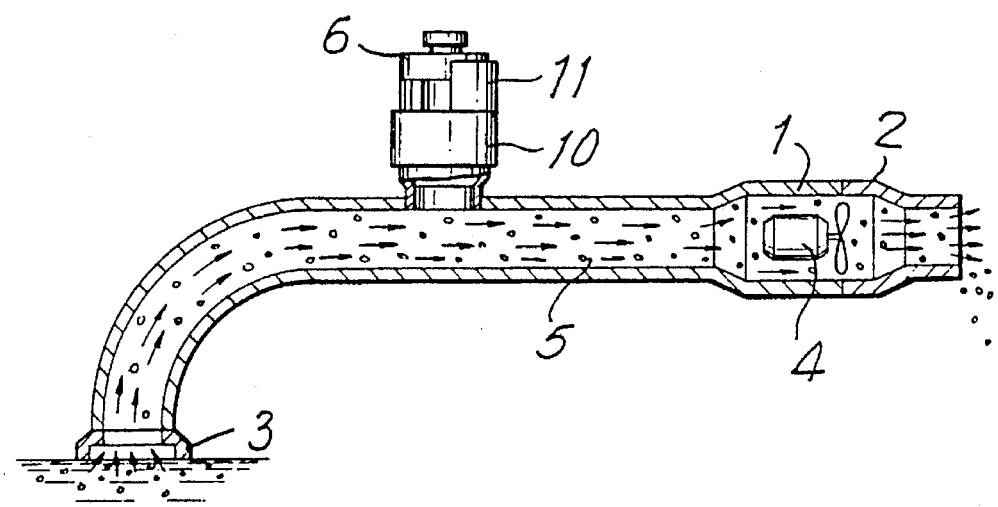
FIG. 1 is a view showing a longitudinal section of a suction transporting device in accordance with our invention.

A suction transporting device in accordance with one embodiment of the present invention is shown in FIG. 1 and has a suction line 1 and a pumping line 2. The suction line 1 has a suction nozzle 3, a source of suction formed, for example, as a fan with a motor 4, and a hollow body 5 connecting the suction nozzle 3 with the source of suction. When the suction transporting device and method are used for vaccum cleaning, the device is usually supplied with a container or bag for collecting transported particles. Such means are generally known and therefore not shown in the drawings.

The suction transporting device of the invention has a modulator of suction force, identified as a whole with reference numeral 6. The modulator has a housing 7 with an inlet 9 which communicates the interior of the modulator with the environment, and a hollow member 8 which connects the interior of the housing 7 with the interior of the suction line 1. The modulator also includes a valve element for adjusting a shape and dimensions of the inlet 9. The valve element includes valve members 10 and 11. In the shown embodiment the valve member 10 is formed as a closed ring with the height equal to the height of the inlet 9, while the valve member 11 is formed as a ring with a cutout. The valve member 10 is longitudinally displaceable relative to the housing 7 or in particular is displaceable in the direction of an axis of the housing 7. The valve member 11 is turnable and longitudinally displaceable relative to the axis of the housing 7.

The modulator 6 further has a body 12 which is arranged inside the housing 7 and has an inlet opening 13 in its wall and a plurality of holes 14 in its bottom. A drive 15 formed, for example, as an electric motor is connected with the bottom of the body 12 and turns the latter. The drive 15 has a regulator for regulating its velocity. The slot in the valve member 11, the inlet 9 of the housing 7, the opening 13 in the valve body 12, the holes 14 in the valve body 12 and the center opening of the member 8 together form a passage which communicates the interior of the suction line 1 with atmosphere. It should be emphasized that the drive for the valve body 12 can be formed in a different manner, such as for example by a pneumatic or hydraulic motor, a small turbine actuated by a flow of substance coming in from the environment through a small additional adjustable opening in the housing of the modulator, etc. The valve body 12 can also be formed differently, for example as an electromagnetic valve provided with means for regulating the frequency and the duration of time of its opening.

Figure 4:
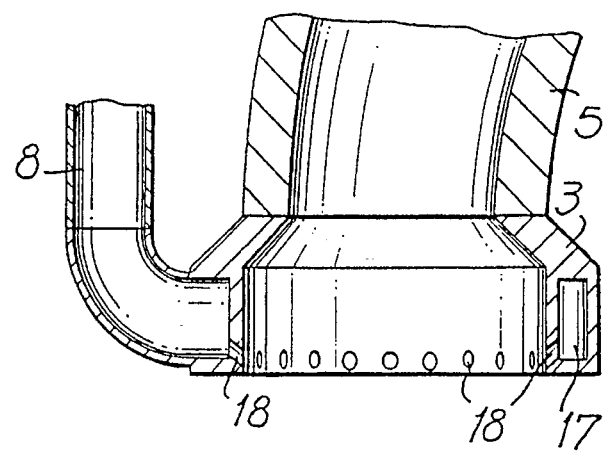
FIG. 4 is a view showing a section of a suction nozzle of the device in accordance with another embodiment of the invention.

The suction nozzle 3 in accordance with another embodiment of the invention is shown in FIG. 4 and provided with a hollow, closed channel 17. Its shape corresponds to the shape of the bottom of the suction nozzle 3. The channel 17 has a plurality of passages 18 extending through its internal wall into the interior of the suction line at the nearest proximity of the bottom of the suction nozzle 3. The channel 17 is connected with the interior of the modulator 6 by the member 8.

Figure 2:
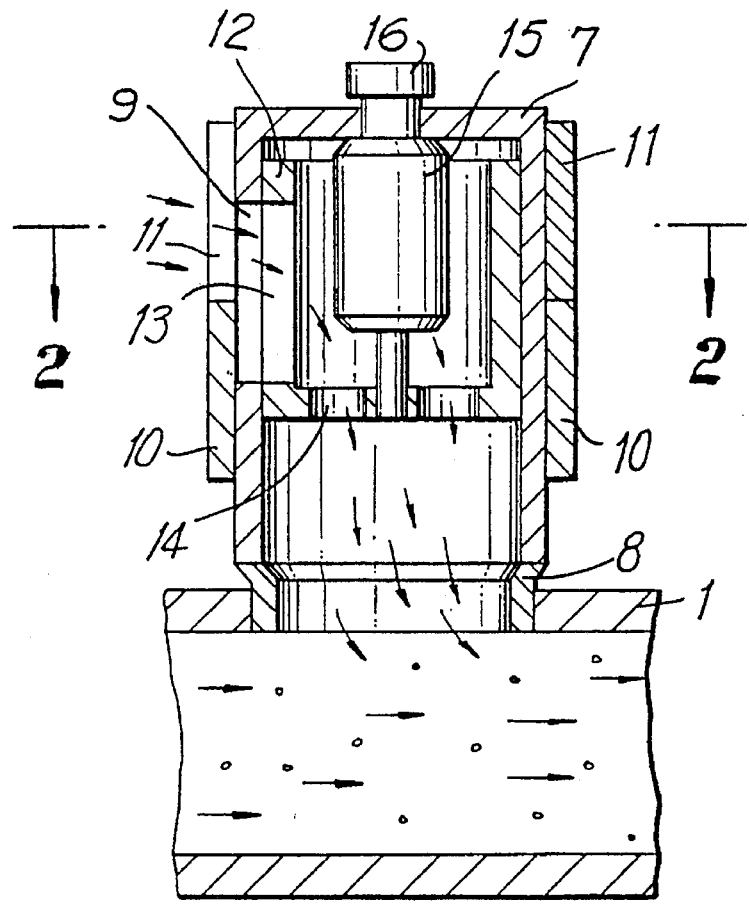
Figure 3:
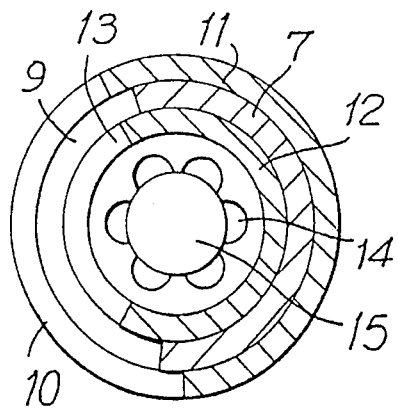
FIG. 3 is a section of the modulator taken along the line II—II of FIG. 2.
Figure 5:
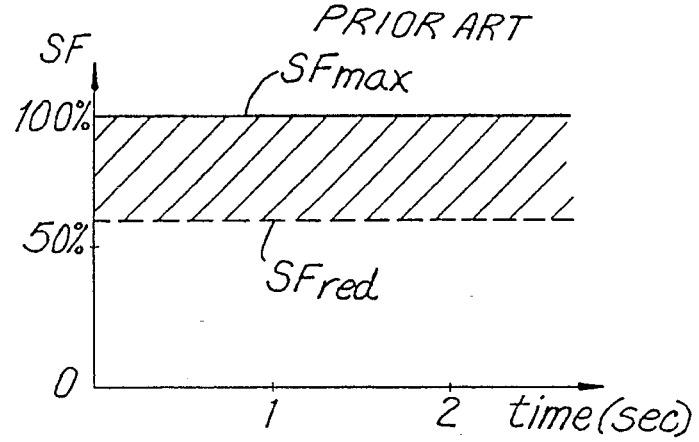
FIG. 5 is a view showing a graph of a maximum suction force and a reduced suction force as a function of time for a conventional suction transporting device.

The suction transporting method of the invention is performed and the suction transporting device of the invention operates in the following manner:

When the suction transporting device is in an inoperative position, the pressure in the suction line 1 and the environment is the same. When the source 4 of suction is turned on, the pressure in the suction line 1 becomes lower than the pressure in the environment. The carrying agent shown in FIG. 1 with small arrows is sucked from the environment under the nozzle 3, taking in the particles of the material which is accumulated on the surface to which the suction nozzle 3 is applied, as shown by the small circles in FIG. 1. When the modulator 6 is in an inoperative position, the suction transporting device operates in a conventional manner. In this case the drive 15 is turned off and the opening 13 of the valve body 12 is positioned against the inlet 9. The inlet 9 can be completely or partially opened by actuating either the member 10 or the member 11, to provide a desirable permanent suction force reduction. When the inlet 9 is open, the matter (e.g., air) from the environment travels through the inlet 9, the opening 13, the holes 14, and the joint hollow member 8 into the suction line 1, as shown in FIG. 2. In the second embodiment shown in FIG. 4, the matter from the environment travels through the members 9, 13, 14, and 8 and through the channel 17 and the passages 18 and comes into the suction line 1. The matter coming in from the environment is normally a carrying agent as in conventional vacuum cleaners. In case of a suction dredge, this matter can be air or water depending on where the modulator is installed. When the inlet 9 is permanently open, the suction force is permanently reduced. This is shown graphically in FIG. 5. The lines $SF_{max}$ and $SF_{red}$ represent the suction force at the closed and opened inlet 9 respectively. The shaded area between two lines shows loss of the efficiency of transportation during the time of operation as in a conventional device.

Figure 6:
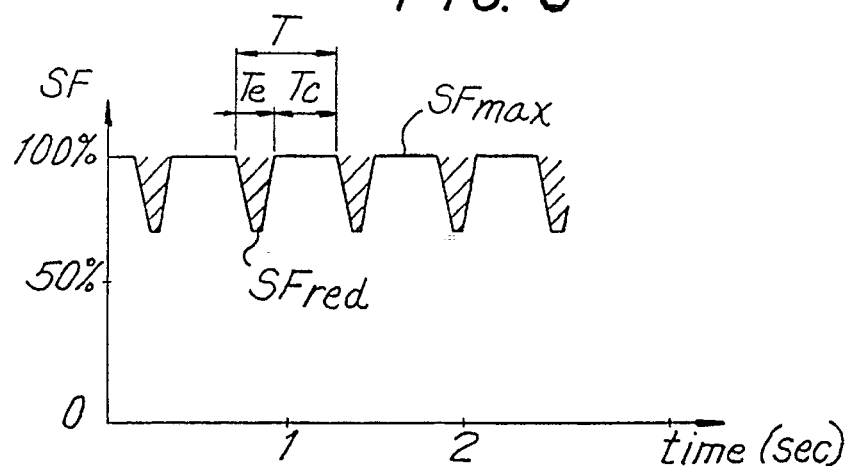
FIG. 6 is a view showing a graph of a variation of the suction force with time in the suction transporting device in accordance with the present invention.

FIG. 6 graphically illustrates the operation of the modulator in accordance with the present invention, when the drive 15 is turned on and the valve body is rotated. The curve SF shows the variation of a suction force as a function of time. The time T is a period of one cycle of the curve and corresponds to one revolution of the valve body 12. Within the period T the modulator 6 is open during the time of exposition $T_e$ and closed for the rest of the period. During the time of exposition when the opening 13 of the valve body 12 passes along the inlet 9, the carrying agent can travel from the environment through the inlet 9 and the opening 13 into the interior of the modulator and further through the holes 14 and the member 8 into the interior of the transporting line 1. During this part of a cycle the suction force declines from its maximum when the inlet 9 was completely closed, reaches its minimum when the inlet 9 is completely open, and returns back to its maximum after the opening 13 has passed the inlet 9 and it is closed again by the valve body 12. During the rest of the cycle ($T_c$) the inlet 9 remains closed, the carrying agent can enter the transporting line only through the suction nozzle 3, and the suction force remains at its maximum value until the opening 13 starts passing by the inlet 9 and the new cycle begins. The shaded area in FIG. 6 represents the loss of efficiency of transporting during those parts of the cycles when the modulator 6 is open.

The total efficiency loss in the disclosed transporting device is significantly less than in the conventional device, since the suction force is reduced not permanently, but instead during short periods of time. At the same time the mobility of the suction nozzle in the inventive suction transporting device is not lower than in the conventional device due to the fact that periodical stickings of the suction nozzle to the surface during very short moments (fractions of a second) are not noticeable for a user. Both the mobility of the suction nozzle and the efficiency of the transporting depend on the following parameters:

ratio between the time of exposition ($T_e$) and the time of closing $T_c$ within one cycle, each in turn depends on the ratio between the width of the inlet 9 and the width of the opening 13. This ratio can be changed by adjusting the initial width of the inlet 9, by turning the member 11 around the housing 7;

period T of one cycle which depends on the velocity of rotation of the valve body 12. It can be changed by adjusting the velocity of the drive 15 with the use of the regulator 16;

maximal reduction of the suction force which depends on the total area of the cross-section of the inlet 9. This area can be adjusted by displacing the member 10 together with the member 11 up and down along the housing 7. This operation sets up the initial area of the cross-section of the inlet 11 without changing its initial width which can be already preset.

The experiments with the regular canister vacuum cleaner provided with the modulator according to the present invention showed that the adjustment of all parameters takes just 1–2 minutes and does not need special skills. The ranges of the adjustment required for optimization of the operation for a particular design of a suction transporting device depends on its field of use, the type of carrying agent, the range of sizes and weights of particles to be transported, etc. The experiments conducted by the inventors with the suction cleaning device in accordance with the present invention showed that the range of the required regulation of frequency was from 0 to 30 Hertz, and the range of the required regulation of the time of exposition was from 5% to 60% of the total period, that is the ratio in the numerator $T_e/T_c$ was from 5/95 to 60/40. The range of the regulation of the suction force reduction was within 0–35% of the maximum suction force developed in the nozzle of the vacuum cleaner.

The inventive suction transporting method and device have a significantly higher efficiency than the conventional methods and devices with reduction of the suction force. The efficiency is higher in the second embodiment since practically 100% of the carrying agent passing through the suction device does the transporting job before being dumped back into the environment. The advantage of the first embodiment is that the suction force modulator can be used as an improving attachment to many existing suction transporting devices. An additional increase of the efficiency of the suction transporting device of the invention is due to the agitating effect which occurs because of the amplitude variation of the suction force applied to the material, at least by the regulator of the drive. Periodical increase and decrease of forces acting on the particles to be transported creates a swinging movement. Due to this action the particles can be better separated from the surface where they accumulate, and also better separated from each other. The agitating effect is stronger in the second embodiment of the invention, since not only the magnitude but also the direction or in other words the whole vector of the suction force changes periodically.

We claim:

1. A method of suction transporting, comprising the steps of applying a suction to a transporting line by suction means so that a material is transported through the transporting line from an inlet thereof to an outlet thereof; and modulating a suction force of the suction produced in the transporting line by communicating an interior of the transporting line with atmosphere through a passage, and periodically changing an area and a shape of the passage during the transporting by power drive.

2. A method as defined in claim 1, further comprising the step of adjusting an initial area and shape of a minimal cross section of the passage, said periodically changing including periodically changing of the adjusted initial area and shape of the minimal cross section of the passage.

3. A method as defined in claim 1, wherein said periodically changing includes periodically changing the area and the shape of the passage with a controlled speed.

4. A device for suction transporting, the device comprising a transporting line having an inlet and an outlet; suction means connected with said transporting line and creating in it a suction which transports a material through said transporting line from said inlet to said outlet; and means for modulating a suction force of the suction produced in said transporting line and including a passage which communicates an interior of said transporting line with atmosphere, and power drive-operated means for periodically changing an area and a shape of said passage during the transporting.

5. A device as defined in claim 4, wherein said power-drive-operated means include a power drive and a valve body cooperating with said passage and driven by said power drive so as to change the area and the shape of said passage.

6. A device as defined in claim 5, wherein said modulating means further includes a housing around said passage and having a housing inlet and a housing outlet forming a part of said passage, and a valve element with a first valve part which is longitudinally displaceable relative to said housing inlet and a second valve part which is turnable relative to said housing inlet.

7. A device as defined in claim 6, wherein said valve body is is rotatable by said power drive and has an inlet cooperating with said housing inlet and an outlet communicating with the interior of said transporting line.

8. A device as defined in claim 7, wherein said second valve part and said valve body are turnable about the same axis, said first valve part and said second valve part being longitudinally displaceable along said axis.

9. A device as defined in claim 4, further comprising an adjusting element operative for adjusting an initial area and shape of a minimal cross section of the passage, said power drive-operated means periodically changing the adjusted initial area and shape of the minimal cross section of the passage.

10. A device as defined in claim 4, wherein said modulating means further includes a speed controller for controlling a speed of said power-drive operated means.

* * * * *